(12) United States Patent
Daniele

(10) Patent No.: US 9,324,217 B2
(45) Date of Patent: Apr. 26, 2016

(54) SYSTEM FOR TRANSMITTING AN ALERT

(71) Applicant: Commissariat à l'énergie atomique et aux énergies alternatives, Paris (FR)

(72) Inventor: Norbert Daniele, Bernin (FR)

(73) Assignee: Commissariat a L'Energie Atomique et Aux Energies Alternatives, Paris (FR)

( * ) Notice: Subject to any disclaimer, the term of this patent is extended or adjusted under 35 U.S.C. 154(b) by 66 days.

(21) Appl. No.: 14/044,907

(22) Filed: Oct. 3, 2013

(65) Prior Publication Data

US 2014/0091927 A1  Apr. 3, 2014

(30) Foreign Application Priority Data

Oct. 3, 2012 (FR) .................................. 12 59380

(51) Int. Cl.
| | |
|---|---|
| G08B 1/08 | (2006.01) |
| G08B 5/22 | (2006.01) |
| H04W 4/02 | (2009.01) |
| H04W 4/22 | (2009.01) |
| G08B 21/02 | (2006.01) |
| G08B 21/04 | (2006.01) |

(52) U.S. Cl.
CPC .............. *G08B 5/22* (2013.01); *G08B 21/0208* (2013.01); *G08B 21/0227* (2013.01); *G08B 21/0258* (2013.01); *G08B 21/0269* (2013.01); *G08B 21/0294* (2013.01); *G08B 21/043* (2013.01); *H04W 4/021* (2013.01); *H04W 4/22* (2013.01)

(58) Field of Classification Search
None
See application file for complete search history.

(56) References Cited

U.S. PATENT DOCUMENTS

| | | | | |
|---|---|---|---|---|
| 5,144,323 | A * | 9/1992 | Yonkers | 342/386 |
| 6,300,875 | B1 * | 10/2001 | Schafer | 340/573.1 |
| 2002/0070881 | A1 * | 6/2002 | Marcarelli et al. | 340/988 |
| 2002/0158754 | A1 * | 10/2002 | Tabata et al. | 340/438 |
| 2005/0258958 | A1 | 11/2005 | Lai | |
| 2008/0191863 | A1 * | 8/2008 | Boling et al. | 340/521 |
| 2008/0316040 | A1 | 12/2008 | Aberlenc | |
| 2012/0319842 | A1 * | 12/2012 | Amis | 340/540 |

FOREIGN PATENT DOCUMENTS

| | | |
|---|---|---|
| WO | WO2009/136259 | 11/2009 |
| WO | WO2011/060388 | 5/2011 |

* cited by examiner

*Primary Examiner* — Firmin Backer
*Assistant Examiner* — Brian Wilson
(74) *Attorney, Agent, or Firm* — Occhiuti & Rohlicek LLP

(57) ABSTRACT

An alert beacon carried directly by a human being is equipped with a transmit circuit able to produce an alert signal transmitted on the same channel as that used by a walkie-talkie. The transmit circuit has a memory containing, for each symbol of the coordinates of the current position of the alert beacon, an audio transcription of the symbol, and a microcontroller able to introduce, into the alert signal produced, the audio transcriptions recorded in the memory corresponding to each symbol of the coordinates in such a way that the coordinates can be played back in the form of a voice message comprehensible to a user of any walkie-talkie that has received this message on a channel that is being listened to.

9 Claims, 2 Drawing Sheets

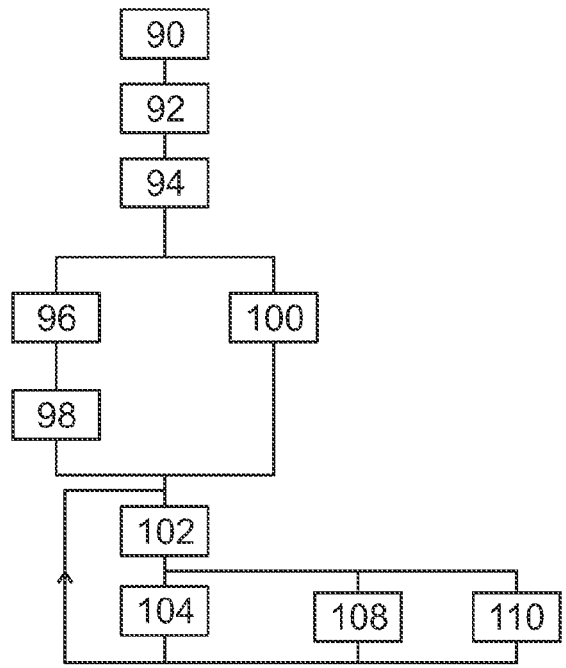
Fig. 3
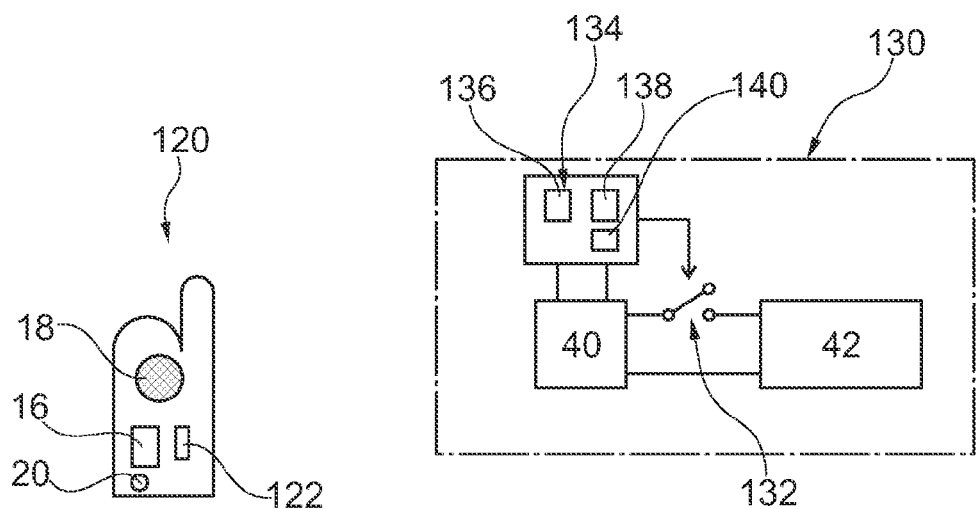
Fig. 4
Fig. 5

SYSTEM FOR TRANSMITTING AN ALERT

CROSS-REFERENCE TO RELATED APPLICATIONS

Under 35 USC 119, this application claims the benefit of the priority date of French Patent Application 1259380, filed Oct. 3, 2012, the content of which is herein incorporated by reference.

FIELD OF DISCLOSURE

The invention relates to a system for transmitting an alert capable to work in the absence of cellular network as well as to an alert beacon for this system. The subject of the invention is also a rucksack incorporating this alert beacon.

BACKGROUND

By cellular network is meant mobile telephone networks such as those using the GSM (Global System for Mobile Communications), GPRS (General Packet Radio Service), UMTS (Universal Mobile Telecommunications System), LTE (Long Term Evolution) standards. Typically, a cellular network is divided spatially into a multitude of adjoining radio cells in which the same frequencies are used for telephoning.

Systems for transmitting an alert in the absence of cellular network are used to warn the rescue services in case of accident. There exists a large number of alert transmission systems used, in particular, within the framework of outdoor activity such as hiking, cycling, windsurfing or the like. Indeed such activities frequently take place at sites not covered by a cellular network.

Known systems comprise:
- at least one walkie-talkie able to be carried directly by a human being, this walkie-talkie comprising:
  - a radioelectric transmitter-receiver able to listen directly to at least one channel used to exchange audio signals alternately with other walkie-talkies, and
  - a loudspeaker able to transform the audio signal received on this channel into a voice message directly perceivable to a human being who is carrying this walkie-talkie,
- an alert beacon that can be carried directly by a human being, different from the one carrying the walkie-talkie, during an outdoor activity, this beacon comprising:
  - a geo-location module able to generate coordinates, in the form of a succession of numerical symbols, corresponding to the current position of the beacon on the terrestrial surface with a resolution of less than 500 m, and
  - a transmit circuit able to produce an alert signal containing the coordinates generated and to transmit this alert signal produced in the form of an audio signal on the same channel as that used by the walkie-talkie.

Such systems are, for example, used in the "Rino 110®" walkie-talkies from the company Garmin®.

This system presents several drawbacks however. For example, in this system the alert beacon is a walkie-talkie identical to the others. It therefore comprises a receiver and a screen for displaying GPS coordinates. Because of these elements, it is bulky and may turn out to be rather impractical to carry during an outdoor activity. Moreover, in this known system, the GPS coordinates can only be played back to a person in a form that is directly comprehensible to this person if the latter is also equipped with a "Rino 110®" walkie-talkie. Conversely, other walkie-talkies of another brand cannot play back the alert signal transmitted by such a "Rino 110" walkie-talkie in a manner that is directly comprehensible to a human being. Thus, if the people in proximity to the accident are equipped only with a walkie-talkie of this other brand, they cannot be warned of the accident and ascertain its location. Chances of rescuing the victim of the accident are thus lost.

Prior art is also known from US2005/258958A1, US2008/316040A1, WO2009/136259A2 and WO2011/060388A1.

SUMMARY

The invention is aimed at remedying this drawback. Its subject is therefore a system for transmitting an alert in the absence of cellular network.

In the system hereinabove, since the alert signal comprises the audio transcriptions of the coordinates generated by the geo-location module, these coordinates can be played back in the form of a voice message by any walkie-talkie. Thus, in this system for transmitting an alert, the alert signal comprising the coordinates of the alert beacon can be played back by any type of walkie-talkie and not only by those specially designed for this purpose. The probability that a person situated in proximity to the accident can bring assistance to rescue the victim or warn the rescue services is thus substantially increased.

The embodiments of this system can comprise one or more of the characteristics of the dependent claims.

These embodiments furthermore exhibit the following advantages:
- the hooking up of the walkie-talkie to a mapping module by a wire-based or wireless link makes it possible to display the position of the victim to be rescued on a map thereby facilitating location thereof;
- the use of a removable key makes it possible to transform a standard apparatus, such as a telephone, into an apparatus usable to rescue the victim.

The subject of the invention is also an alert beacon for the above system for transmitting an alert.

The embodiments of this alert beacon can comprise one or more of the characteristics of the dependent claims.

These embodiments of the alert beacon furthermore exhibit the following advantages:
- the presence of a module for automatic detection of an accident in the beacon makes it possible to automatically trigger the transmission of the alert signal without manual intervention from the person carrying this beacon;
- the use of an accelerometer in this module for automatic detection of an accident makes it possible to automatically trigger the transmission of the alert signal in response to an impact;
- the use of an inclination sensor in the module for automatic detection of an accident makes it possible to automatically trigger the transmission of the alert signal in case of prolonged abnormal inclination of this alert beacon;
- automatically transmitting the alert signal on each of the available channels makes it possible to increase the probability that the alert message is received;
- repeating several times the transmission of the alert message on one and the same channel also makes it possible to increase the probability that the alert signal is received;
- using a beacon devoid of loudspeaker, microphone and of screen limits the bulk thereof.

The subject of the invention is also a rucksack comprising the above alert beacon fixed without any degree of freedom to a wall of this rucksack.

In one aspect, the invention includes a system for transmitting an alert even in the absence of cellular network. Such a system includes a walkie-talkie configured to be carried by a first human being. The walkie-talkie includes a radio-electric transmitter-receiver and a loudspeaker. The radio-electric transmitter-receiver is configured to listen directly to a channel used to exchange audio signals alternately with other walkie-talkies, and the loudspeaker is configured to transmit the audio signal received on the channel used to exchange audio signals alternately with other walkie-talkies into a voice message directly perceivable by the first human being. The system further includes an alert beacon that can be carried, during an outdoor activity, by a second human being. The alert beacon includes a geo-location module and a transmit circuit. The transmit circuit includes a memory and a microcontroller. The geo-location module is configured to generate coordinates, in the form of a succession of numerical symbols, corresponding to a current position of the alert beacon on the terrestrial surface with a resolution of less than 500 meters. The transmit circuit is configured to produce an alert signal containing the generated coordinates and to transmit the produced alert signal as an audio signal on the channel. The memory contains, for each symbol of the generated coordinates, an audio transcription of the symbol. The microcontroller is configured to introduce, into the alert signal produced, audio transcriptions recorded in the memory. These audio transcriptions correspond to each symbol of the generated coordinates in such a way that the generated coordinates can be played back in the form of a voice message directly perceivable and comprehensible to a user of any walkie-talkie that has received the message on a channel that is being listened to.

In another aspect, the invention features an alert beacon configured to be carried directly by a human being during an outdoor activity. The alert beacon includes a geo-location module configured to generate coordinates in the form of a succession of numerical symbols, the coordinates corresponding to a current position of the alert beacon on the terrestrial surface, with a resolution of less than 500 meters, and a transmit circuit configured to produce an alert signal containing the generated coordinates generated and to transmit the alert signal produced, in the form of an audio signal on the same channel as that used by a walkie-talkie. The transmit circuit includes a memory containing, for each symbol of the generated coordinates, an audio transcription of the symbol, and a microcontroller configured to introduce into the alert signal, the audio transcriptions, recorded in the memory, corresponding to each symbol of the generated coordinates in such a way that the generated coordinates can be played back as a voice message directly perceivable and comprehensible to a user of a walkie-talkie that has received the alert signal on a channel that is being listened to.

BRIEF DESCRIPTION OF THE FIGURES

The invention will be better understood on reading the description which follows, given solely by way of nonlimiting example and made with reference to the drawings in which:

FIG. 3 is a flowchart of a method for transmitting an alert with the aid of the system of FIG. 1;

FIG. 4 is a schematic illustration of a walkie-talkie able to be used in the system of FIG. 1; and FIG. 5 is a schematic illustration of a second possible embodiment of the alert beacon of the system of FIG. 1.

DETAILED DESCRIPTION

In these figures, the same references are used to designate the same elements.

Hereinafter in this description, the characteristics and functions that are well known to the person skilled in the art are not described in detail.

Figure 1:
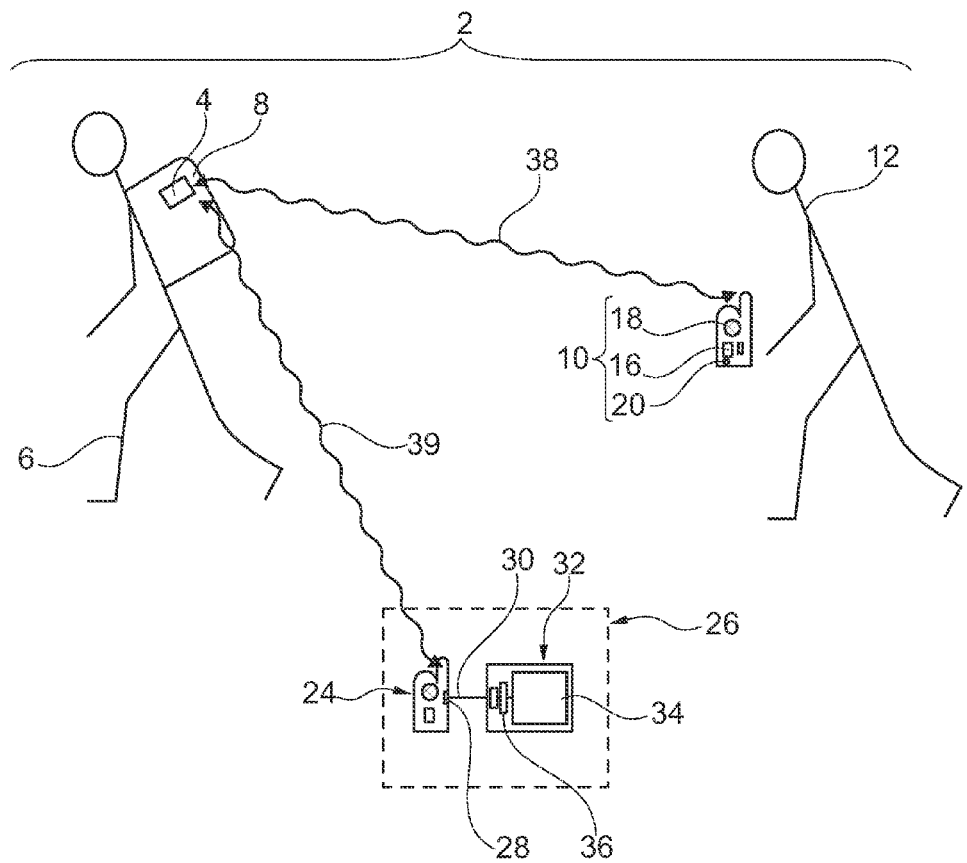
FIG. 1 is a schematic illustration of a system for transmitting an alert.

FIG. 1 represents a system 2 for transmitting an alert allowing the triggering of an intervention to rescue a victim of an accident. More precisely, the system 2 makes it possible to communicate the position of the victim directly to the rescue service or to people able to bring assistance to rescue the victim or else to people able to relay this information to rescue services.

Here, the system 2 is described in the particular case where the accident occurs within the framework of the practice of an outdoor activity. More precisely, the system 2 is illustrated in the case where the outdoor activity is hiking.

The system 2 comprises an alert beacon 4 carried by a person 6 in the process of hiking. For this purpose, the beacon 4 is lightweight. It weighs less than 1 kg and, typically, less than 200 g or 100 g.

The beacon 4 is capable of transmitting an alert signal in the case where this person 6 is the victim of an accident. The alert signal comprises the geographical coordinates of the beacon 4 so as to facilitate the location of the victim. The alert signal is transmitted on the same channels as those used by walkie-talkies. Consequently, this alert signal can be received by walkie-talkies situated in the zone of coverage of the beacon 4. Typically, this coverage zone is less than 5 km and, generally, less than 2 km or 1 km. Since the beacon 4 uses the same channels as those used by the walkie-talkies, the transmission of the alert signal does not require any fixed infrastructures situated in proximity to the beacon 4. Moreover, the beacon 4 can operate even outside of the zones of coverage of cellular telephone networks.

In the particular case described here, the beacon 4 is fixed without any degree of freedom to a wall of a rucksack 8. The beacon 4 is described in greater detail with reference to FIG. 2.

The system 2 also comprises one or more walkie-talkies able to communicate with one another. To simplify FIG. 1, only a walkie-talkie 10 carried by a person 12 is represented. The walkie-talkie 10 is any conventional walkie-talkie. Here, this walkie-talkie complies with the PMR (Private Mobile Radio) 446 standard in force in Europe. This standard is also known by the reference ETS 300 296. In this case, the walkie-talkie 10 uses vacant frequencies around 446 MHz to communicate with other walkie-talkies. More precisely, this standard defines eight channels usable by walkie-talkies lying between 446.00625 MHz and 446.09375 MHz.

For this purpose, the walkie-talkie 10 comprises a radio-electric transmitter-receiver 16 able to listen to and to receive audio signals on any one of the eight channels defined by the PMR 446 standard. The walkie-talkie 10 also comprises: a loudspeaker 18 for transforming the audio signals received on a channel into a voice message directly perceivable by the person 12 carrying this walkie-talkie, and a microphone 20 capable of transforming a voice message spoken by the person 12 into an audio signal transmitted on one of the eight channels defined by the PMR 446 standard.

Typically, two walkie-talkies in mutual communication use the same channel to exchange their audio signals. Communication between these two walkie-talkies is therefore carried out alternately. Such a communication is also known by the term "half-duplex." Indeed, a walkie-talkie may not transmit and receive at the same time an audio signal on one and the same channel. For this purpose, to manage the alternation of the communications, walkie-talkies are equipped with a button, known by the acronym "PTT" ("Push To Talk"), that can be manually actuated by the person carrying the walkie-talkie so as to toggle, alternately, between a transmit mode, in which the walkie-talkie solely transmits the audio signals, and a receive mode, in which the walkie-talkie solely receives the audio signals.

The system 2 also comprises a walkie-talkie 24 housed inside a rescue vehicle 26. In FIG. 1, the vehicle 26 is represented by a simple dashed square so as to simplify the illustration. For example, the vehicle 26 can be a helicopter or an all-terrain vehicle.

The walkie-talkie 24 is, for example, identical to the walkie-talkie 10 except that it comprises, in addition, a socket 28 hooked up by way of a wire-based link 30 to a display 32. Typically, the socket 28 is a "jack" socket so as to transmit the audio signal received by the walkie-talkie 24 to the display 32 via the wire-based link 30.

The display 32 comprises a screen 34 able to display GPS coordinates, and a calculator 36 hooked up to the end of the wire-based link 30. The calculator 36 extracts the GPS coordinates contained in a coded signal received by way of the link 30 and then displays them on the screen 34. For example, the extracted GPS coordinates are displayed in the form of symbols or in the form of a position on a geographical map.

The wireless radio link able to be established between the beacon 4 and the walkie-talkie 10 bears the reference 38 in FIG. 1. The wireless radio link able to be established between the beacon 4 and the walkie-talkie 24 bears the reference 39. It will advantageously entail a link using a digital standard such as DPMR (Digital Private Mobile Radio). The radio links are represented by wavy arrows in FIG. 1.

Figure 2:
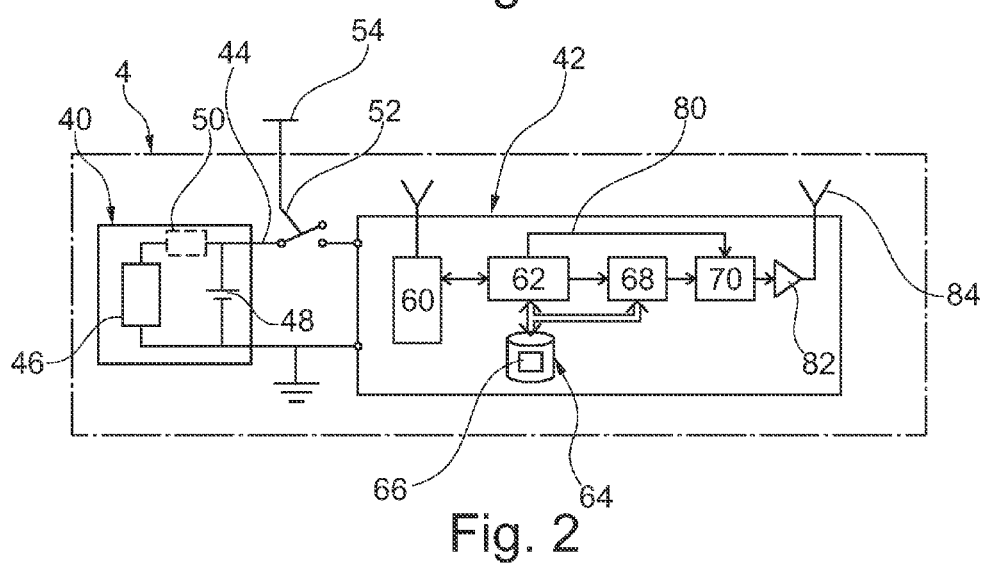
FIG. 2 is a schematic illustration of a first embodiment of an alert beacon used in the system of FIG. 1.

FIG. 2 represents the beacon 4 in greater detail. The beacon 4 comprises an electrical power supply source 40 hooked up to a circuit 42 for transmitting an alert signal. A source 40 powers the circuit 42 by way of a wire-based link 44.

By way of illustration, the source 40 comprises a photovoltaic panel 46 and a battery 48. The photovoltaic panel 46 makes it possible to recharge the battery 48 on the basis of solar energy. For this purpose, it is hooked up to the terminals of the battery 48 by way of an optional circuit 50 for checking the charge of the battery 48.

The battery 48 is a battery of small dimension. In some embodiments, the battery 48 is able to deliver 1200 mA-h at 3.6 V.

The link 44 comprises a switch 52 that can be switched manually by the person 6 between an idle position and an active position. In the idle position, the switch 52 isolates the circuit 42 electrically from the source 40 so that the circuit 42 is not powered. Conversely, in the active position, the switch 52 hooks up the circuit 42 electrically to the source 40 so that the circuit 42 is powered and therefore activated.

For example, a part of the switch 52 is mechanically hooked to a handle 54 of the rucksack 8. This handle 54 is disposed on the rucksack 8 in a place that the person 6 can easily grab in case of accident. For example, the handle 54 is housed on a strap of the rucksack 8.

When the person 6 pulls on the handle 54, the switch 52 transitions from its idle position to its active position.

The circuit 42 comprises a geo-location module 62 able to measure the geographical position of the beacon 4 with a resolution of less than 500 meters and, preferably, less than 100 meters or 20 meters. Accordingly, typically, this module 60 receives various signals from several geostationary satellites. In one example, the module 60 is a GPS (Global Positioning System) module.

The module 60 generates coordinates in a digital format coding the position of the beacon 4 in a geodesic system. The geodesic system is, for example, the WGS 84 geodesic system (World Geodesic System 84). The coordinates in the digital format take the form of a succession of symbols, each symbol corresponding to the value of one of the coordinates in the geodesic system used. Subsequently, given that the module 60 is described in the particular case where the latter is a GPS module, these coordinates are also called GPS coordinates.

The circuit 42 also comprises a programmable microcontroller 62, able to execute instructions recorded in a memory 64. The memory 64 comprises the instructions necessary to execute the method of FIG. 3. Moreover, the memory 64 comprises a lookup table 66 associating, with each possible symbol of the GPS coordinates, an audio transcription of this symbol. The audio transcription of a symbol is a piece of audio signal able to be played back, by any walkie-talkie in accordance with the PMR 446 standard, in the form of a voice message directly perceivable and comprehensible to a human being. For this purpose, the audio transcription is identical to the piece of audio signal that would be transmitted by the walkie-talkie 10 if the person 12 were to speak, into the microphone 20, the symbol associated with this audio transcription. Thus, generally, the audio transcription of a symbol codes a combination of frequencies corresponding to the speaking of that symbol by a human being.

The microcontroller 62 is connected to an audio formatting module 68, itself connected to the input of a transmitter 70. Here, the module 68 converts the digital alert signal generated by the microcontroller 62 into an audio signal transmitted to the input of the transmitter 70. For example, this module 68 converts the digital signal received into an analog signal.

The transmitter 70 codes and modulates the audio signal received on its input so as to transmit it on a channel selected from among the eight possible channels defined by the PMR 446 standard. Here, the channel on which the alert signal is transmitted is selected by the microcontroller 62 by way of a wire-based link 80.

The circuit 42 also comprises an amplifier 82 that amplifies the alert radiofrequency signal received before it is radiated by an antenna 84. The antenna 84 is a wire-based antenna or a woven antenna.

On the other hand, to minimize its bulk, the beacon 4 does not comprise any loudspeaker, microphone, or screen. Preferably, the beacon 4 does not comprise any radioelectric receiver either.

The operation of the system 2 will now be described in greater detail with reference to the method of FIG. 3.

During a step 90, in the case of an accident, the person 6 pulls on the handle 54. This triggers the switching of the switch 52 from its idle position to its active position. From this moment on, the circuit 42 is powered and therefore activated.

Thereafter, during a step 92, as soon as the circuit 42 is activated, the geo-location module 60 measures the position of the beacon 4 and generates GPS coordinates, in a digital format, corresponding to the current position of this beacon.

For example, hereinafter in this description, it is considered that the position of the beacon is the following position: 45°, 10' North and 5°, 43' East.

During a step 94, the microcontroller 62 acquires the GPS coordinates generated by the module 60.

During a step 96, the microcontroller 62 searches through the table 66 for the audio transcription associated with each of the symbols of the acquired GPS coordinates.

During a step 98, the microcontroller 62 produces a voice alert signal containing the audio transcription of each symbol of the GPS coordinates to be transmitted. For example, this voice alert signal is the following "help at position 45° and 10' North and 5° and 43' East".

In parallel with steps 96 and 98, during a step 100, the microcontroller 62 also generates a coded alert message in which the current position of the beacon 4 is coded without using the audio transcriptions of the symbols of the GPS coordinates. For example, the GPS coordinates are coded in this signal with the aid of a modulation of frequencies or of a temporal modulation or of a combination of these two modulations. For example, it is here assumed that an FSK (Frequency-Shift Keying) frequency modulation is used. However, any other modulation compatible with the digital standards, for example with the DPMR standard for Europe, can also be used.

Once the voice alert message and coded alert message have been generated, during a step 102, the microcontroller 62 selects a transmit channel from among the eight channels defined by the PMR 446 standard.

Thereafter, during a step 104, the module 68 formats the alert message before transmitting it to the transmitter 70. Here, this formatting consists in carrying out a digital-to-analog conversion.

During step 104, the transmitter 70 codes and modulates the voice alert signals in the same manner as the audio signals exchanged between the walkie-talkies. Thereafter, it transmits the voice alert message and coded alert message successively on the channel selected by way of the links 38, 39.

After a pre-programmed transmit time, the method returns to step 102 where the microcontroller 62 selects another channel to transmit the voice alert message and the coded alert message. For example, the microcontroller 62 selects the next channel so that when the last channel is reached, it can return to the first channel to transmit the alert messages loopwise on the eight available channels.

In parallel with step 104, during a step 108, the transmitter-receiver 16 of the walkie-talkie 10 listens to a channel. When the voice alert signal is transmitted on this channel, this transmitter-receiver receives it. Thereafter, this voice alert signal is transformed into a voice alert message directly perceivable and comprehensible to the person 12 by the loudspeaker 18. Thus, the person 12 hears the following phrase "help at position 45° and 10' North and 5° and 43' East". The person 12 can then proceed towards the person 6 to rescue him, or he can warn the rescue services and provide them with the position he has just heard.

In parallel with steps 104 and 108, during a step 110, the transmitter-receiver of the walkie-talkie 24 also receives the alert signals. This walkie-talkie 24 transmits the signals received to the display 32 by way of the link 30. If the audio signal received is a coded alert message, the calculator 36 decodes the GPS coordinates contained in the coded alert message and then instructs the display of these coordinates on the screen 34. The coordinates received are stored and displayed continuously on the screen 34. This facilitates the intervention of the rescue services.

FIG. 4 represents a walkie-talkie 120 identical to the walkie-talkie 10 except that the latter comprises, in addition, a module 122 able to relay the voice alert signal and the coded alert signal automatically. More precisely, the module 122 detects whether the audio signal received comprises a specific identifier "RR" indicating that the audio signal received has to be rebroadcast automatically. Only when the audio signal received comprises this identifier "RR," the module 122 then instructs the transmitter-receiver 16 to automatically retransmit the audio signal received on the same channel or on another channel.

The walkie-talkie 120 is advantageously used in the system 2 instead of the walkie-talkie 10 or in addition to the walkie-talkie 10. In this case, the operation of the system 2 is identical to what was described with reference to FIG. 3 except that the circuit 42 incorporates the identifier "RR" into each alert signal. Under these conditions, when the walkie-talkie 120 receives the alert signal, it retransmits it immediately and automatically by way of its transmitter-receiver 16. Thus, the alert signal can be relayed to a walkie-talkie of a person situated in a zone of coverage of the cellular telephone network. This person can then call for rescue with his cellular telephone.

FIG. 5 represents an alert beacon 130 identical to the beacon 4 except that the switch 52 is replaced with a switch 132 whose switching between the idle positions and the active position is controllable by an electrical control signal. Moreover, this beacon 130 comprises a module 134 for automatic detection of information indicative of an accident. This module 134 is able to automatically detect information indicative of an accident and, in response, to automatically instruct the switching of the switch 132 to its active position. For this purpose, the module 134 can comprise various sensors. For example, in an embodiment, the module 134 comprises an accelerometer 136. If the acceleration measured by this accelerometer 136 exceeds a predetermined threshold $S_1$, then the module 134 automatically instructs the switching of the switch 132 to its active position. Indeed, a violent acceleration signifies that the beacon 4 has undergone a significant impact, thereby making it possible to detect an accident.

In addition to, or instead of, the accelerometer 136, the module 134 comprises a sensor 138 of inclination with respect to the vertical and a sensor 140 able to detect the presence of the rucksack on the shoulders of the person 6. If, simultaneously and for a predetermined duration, the sensor 138 detects a recumbent position of the rucksack and, at the same time, the sensor 140 indicates that the rucksack 8 is on the shoulders of the person 6, then the module 134 automatically instructs the switching of the switch 132 to its active position.

Numerous other embodiments are possible. For example, the beacon 4 can be integrated into a jacket or shoes worn by the person 6. This beacon can also be incorporated into a helmet or a bracelet. It can also be incorporated into a bike or any other item of equipment carried with him by the user. What was described previously also applies to other areas of activity such as the nautical area. In this case, the beacon 4 can be integrated into a sailboard or into a paddle boat.

In another embodiment, the person 12 can also carry an apparatus equipped with a voice recognition module and with a mapping module. In one example, this apparatus is a smartphone. When a voice alert signal is received, the person 12 places his apparatus near the loudspeaker 18 of the walkie-talkie 10 and activates the voice recognition module. The voice recognition module then automatically transforms the GPS coordinates contained in the voice message into numerical coordinates and automatically transmits these numerical coordinates to the mapping module. The mapping module then displays, on a map presented on a screen of the apparatus, the position corresponding to the GPS coordinates contained in the voice alert message. This variant thus allows guidance towards the victim directly.

In the rescue context another possibility is to link the walkie-talkie with a smartphone by a simple audio lead furnished with jacks.

Another solution is a removable electronic key or "dongle," able to directly receive the signals transmitted by the beacon 4. This key is directly connected to the smartphone so as to allow, as in the previous embodiments, the use of the functions of the smartphone, and especially the mapping module, to facilitate guidance towards the victim. The electronic key is for example connected to the smartphone by way of a USB (Universal Serial Bus) port.

What was described previously in the particular case where the walkie-talkies comply with the PMR 446 standard can easily be transposed to other transmission standards on other unoccupied transmit channels. For example, the following standards can be used instead of the PMR 446 standard: the American FRS (Family Radio Service) standard, which defines 14 channels lying between 462.5625 MHz and 467.7125 MHz; the LPD (Low Power Device) standard, which uses 69 channels lying between 433.075 MHz and 434.775 MHz; the VHF—GMDSS (Very High Frequency—Global Maritime Distress and Safety System) band, which uses an unoccupied frequency band lying between 156 and 162 MHz; and the CB (Citizen's Band) standard, which uses 40 unoccupied channels lying between 26.965 MHz and 27.405 MHz in Europe or in the USA or frequencies included in a band close to 49 MHz in the United States.

The standard corresponding, in Japan, to the similar service called "Tokutei Shoudenryoku Musen" or "Specified Low Power Radio (SLPR)" and deployed around 422 MHz with a power limitation of 10 mW, can also be used. There are eleven channels lying between 422.0500 and 422.1750 MHz for professional use and ten channels lying between 422.200 and 422.300 MHz for use in leisure activities.

The audio signals transmitted between the beacon 4 and the walkie-talkies or between the walkie-talkies themselves can be analogue or digital audio signals.

The audio transcriptions of each symbol that is able to be used in the GPS coordinates are for example obtained by carrying out a voice synthesis of each of these symbols, and then by transmitting the voice message thus obtained to the input of the microphone 20 of the walkie-talkie 10, and finally by recording, in the table 66, the audio signal corresponding to this symbol generated by the walkie-talkie 10 as input to the transmitter-receiver 16.

The power supply source 40 can be devoid of any photovoltaic panel for recharging the battery 48.

As a variant, the coded alert message is transmitted solely on one and the same channel predetermined in advance and is not transmitted on the other channels. In this case, the walkie-talkie 24 is tuned solely to receive the audio signals transmitted on this predetermined channel.

In another variant, the circuit 44 does not transmit any coded alert signals, and instead transmits only voice alert signals. In this case, the display 32 is equipped with a voice recognition module able to transform the coordinates contained in the voice alert signal into numerical coordinates displayable on the screen 34.

In another variant, the walkie-talkie 24 and the display 32 are omitted.

Having described the invention, and a preferred embodiment thereof, what is claimed as new and secured by United States Letters Patent is:

1. An apparatus comprising a system for transmitting an alert even in the absence of a cellular network, said system comprising a walkie-talkie configured to be carried by a first human being, wherein said walkie-talkie comprises a radio-electric transmitter-receiver and a loudspeaker, wherein said radio-electric transmitter-receiver is configured to listen directly to a channel used to exchange audio signals alternately with other walkie-talkies, and wherein said loudspeaker is configured to transform said audio signal received on said channel used to exchange audio signals alternately with other walkie-talkies into a voice message directly perceivable by said first human being, and an alert beacon that is carried, during an outdoor activity, by a second human being, wherein said alert beacon comprises a geo-location module and a transmit circuit, and wherein said transmit circuit comprises a memory and a microcontroller, wherein said geo-location module is configured to generate coordinates, in the form of a succession of numerical symbols, corresponding to a current position of said alert beacon on a terrestrial surface with a resolution of less than 500 meters, wherein said transmit circuit is configured to produce an alert signal containing said generated coordinates and to transmit said produced alert signal as said audio signal on said channel, wherein said memory contains, for each numerical symbol of said generated coordinates, an audio transcription of said numerical symbol, wherein said microcontroller is configured to introduce, into said alert signal produced, said audio transcriptions recorded in said memory, and wherein said audio transcriptions correspond to each numerical symbol of said generated coordinates in such a way that said generated coordinates are played back in the form of a voice message directly perceivable and comprehensible to said first human of said walkie-talkie that has received said audio signal on said channel that is being listened to, wherein the apparatus further comprises a rucksack having a wall, wherein said alert beacon is fixed without any degree of freedom to said wall, and wherein said alert beacon comprises a module for automatic detection of information indicative of an accident, the module for automatic detection of information indicative of an accident comprises a sensor configured to detect the presence of the rucksack on the shoulders of said second human being and a sensor of inclination with respect to vertical to detect if said second human is in a recumbent position, and said module for automatic detection of information indicative of an accident is configured to automatically trigger the transmission of said alert signal if, simultaneously and for a predetermined period of time, said sensor indicates that the rucksack is on the shoulders of said second human being and said sensor of inclination detects that said second human is in a recumbent position.

2. The apparatus of claim 1, wherein said system further comprises a mapping module configured to receive the alert signal from the alert beacon and to display, on a map, a position that corresponds to said generated coordinates contained in said alert signal.

3. The apparatus of claim 1, wherein said system further comprises a mapping module and a removable electronic key, wherein said mapping module is configured to display, on a map, a position that corresponds to said generated coordinates contained in the alert signal, wherein said removable electronic key is configured to directly receive said alert signal transmitted by said alert beacon, and wherein said removable electronic key is configured to be connected and, alternately, disconnected from said mapping module in a reversible manner.

4. An apparatus comprising an alert beacon configured to be carried directly by a human being during an outdoor activity, said alert beacon comprising a geo-location module configured to generate coordinates in the form of a succession of numerical symbols, said generated coordinates corresponding to a current position of said alert beacon on a terrestrial surface, with a resolution of less than 500 meters, and a transmit circuit configured to produce an alert signal containing said generated coordinates and to transmit said alert signal produced, in the form of an audio signal on a same channel as that used by a walkie-talkie, wherein said transmit circuit comprises a memory containing, for each numerical symbol of said generated coordinates, an audio transcription of said numerical symbol, and a microcontroller configured to introduce into said alert signal, said audio transcriptions, recorded in the memory, corresponding to each numerical symbol of said generated coordinates in such a way that the generated coordinates are played back as a voice message directly perceivable and comprehensible to a user of said walkie-talkie that has received said alert signal on said same channel that is being listened to, wherein the apparatus further comprises a rucksack having a wall, wherein said alert beacon is fixed without any degree of freedom to said wall, and wherein said alert beacon comprises a module for automatic detection of information indicative of an accident, the module for automatic detection of information indicative of an accident comprises a sensor configured to detect the presence of the rucksack on the shoulders of said human being and a sensor of inclination with respect to vertical to detect if said human being is in a recumbent position, and said module for automatic detection of information indicative of an accident is configured to automatically trigger the transmission of said alert signal if, simultaneously and for a predetermined period of time, said sensor indicates that the rucksack is on the shoulders of said human being and said sensor of inclination detects that said human being is in a recumbent position.

5. The apparatus of claim 4, wherein said module for automatic detection of information indicative of an accident further comprises an acceleration sensor, and said module for automatic detection of information indicative of an accident is further configured to automatically trigger said transmission of said alert signal by said transmit circuit in response to detecting that an acceleration measured by said acceleration sensor has crossed a predetermined acceleration threshold.

6. The apparatus of claim 4, wherein said transmit circuit for transmitting said alert signal is programmed to automatically transmit said alert signal alternately on each channel configured to be listened to by said walkie-talkie.

7. The apparatus of claim 4, wherein said transmit circuit for transmitting the alert signal is programmed to automatically repeat transmission of said alert signal on said same channel.

8. The apparatus of claim 4, wherein said transmit circuit is configured to transmit said alert signal in a frequency band selected from the group consisting of the band from 446.00625 MHz to 446.09375 MHz defined by the PMR (Private Mobile Radio) 446 standard, the band from 433.075 MHz to 434.775 MHz defined by the LPD (Low Power Device) standard, the band from 462.5625 MHz to 467.7125 MHz defined by the FRS (Family Radio Service) standard, the band from 26.965 MHz to 27.405 MHz defined by the CB (Citizen's Band) standard, and the band from 422.200 MHz to 422.300 MHz and from 422.0500 MHz to 422.1750 MHz defined for the "Tokutei Shoudenryoku Musen" service in Japan.

9. The apparatus of claim 4, wherein said alert beacon lacks a microphone, a loudspeaker, and a screen.

\* \* \* \* \*